United States Patent
Kochsiek

(10) Patent No.: US 10,486,236 B2
(45) Date of Patent: Nov. 26, 2019

(54) TOOL ASSEMBLY FOR A ROTATING DEVICE

(75) Inventor: Adolf Kochsiek, Leopoldshöhe (DE)

(73) Assignee: IPROTEC MASCHINEN- UND EDELSTAHLPRODUKTE GMBH, Petershagen-Friedewalde (DE)

( * ) Notice: Subject to any disclaimer, the term of this patent is extended or adjusted under 35 U.S.C. 154(b) by 1311 days.

(21) Appl. No.: 14/345,024

(22) PCT Filed: Aug. 30, 2012

(86) PCT No.: PCT/EP2012/003632
§ 371 (c)(1),
(2), (4) Date: Mar. 17, 2014

(87) PCT Pub. No.: WO2013/037459
PCT Pub. Date: Mar. 21, 2013

(65) Prior Publication Data
US 2014/0245871 A1    Sep. 4, 2014

(30) Foreign Application Priority Data

Sep. 16, 2011    (DE) .................. 10 2011 113 385

(51) Int. Cl.
*B23B 5/36*    (2006.01)
*B23Q 27/00*    (2006.01)

(52) U.S. Cl.
CPC ................ *B23B 5/36* (2013.01); *B23Q 27/00* (2013.01); *B23B 2265/12* (2013.01); *Y10T 82/2572* (2015.01)

(58) Field of Classification Search
CPC ........ B23B 2265/12; B23B 5/36; B23Q 27/00
See application file for complete search history.

(56) References Cited

U.S. PATENT DOCUMENTS 5,292,214 A    3/1994 Bishop

FOREIGN PATENT DOCUMENTS

CN    1222118 A    7/1999
DE    2720103 A1    11/1978

*Primary Examiner* — Sara Addisu
(74) *Attorney, Agent, or Firm* — Harness, Dickey & Pierce, P.L.C.

(57) ABSTRACT

Tool assembly for a rotating device having a drive, a control and a supporting arrangement for at least one tool insert. In order to provide a device for off-round turning which can be constructed with little technical and mechanical effort and nonetheless be used at almost any axial position of a workpiece, the application proposes a tool assembly of the type mentioned above. The tool assembly is designed as a crank drive assembly, wherein the supporting arrangement has a swinging piston unit and the crank drive assembly has a crank unit, and the swinging piston unit and the crank unit are connected to one another by a thrust rod unit.

11 Claims, 1 Drawing Sheet

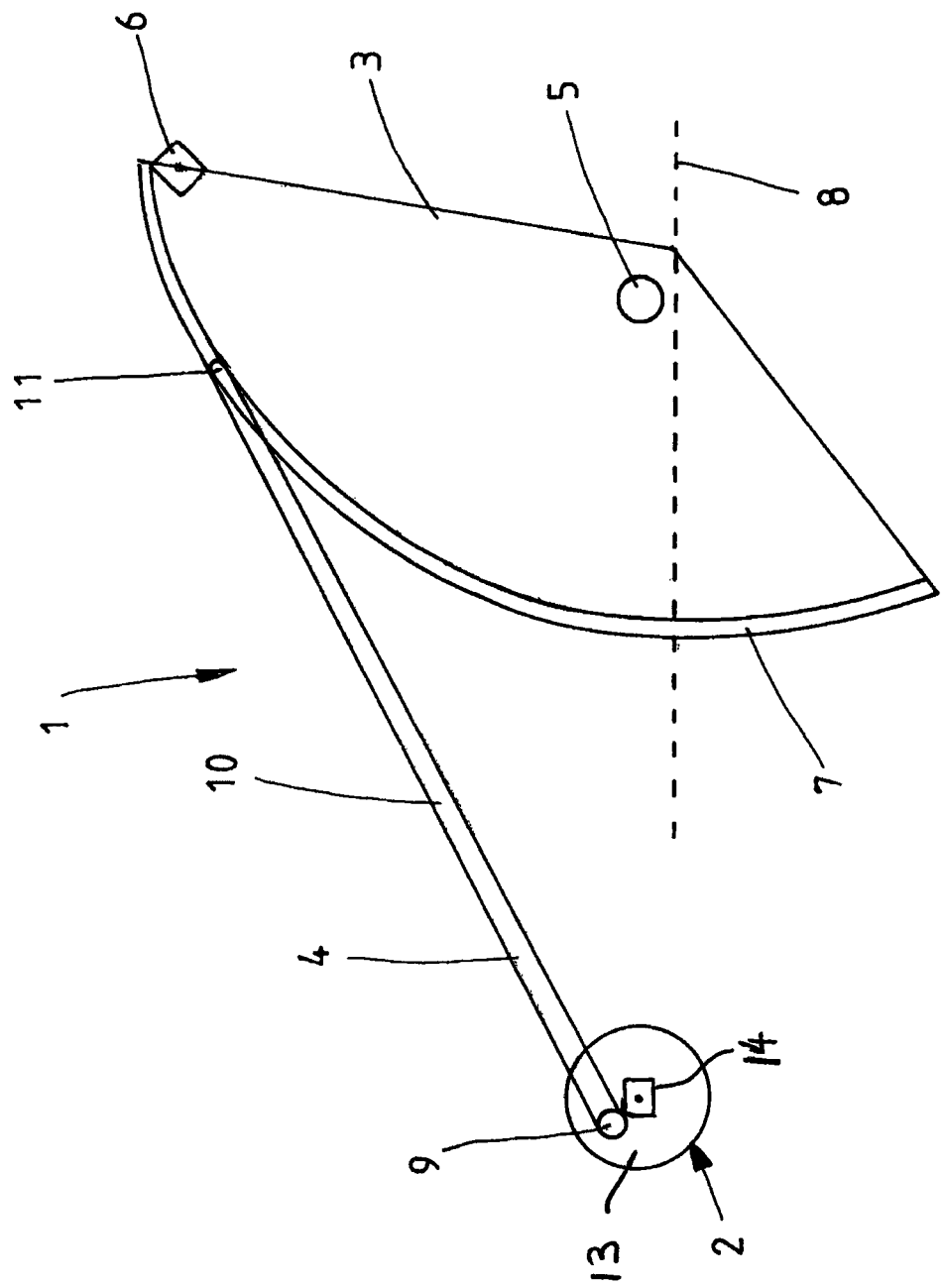

TOOL ASSEMBLY FOR A ROTATING DEVICE

CROSS-REFERENCE TO RELATED APPLICATIONS

This application is a National Stage of International Application No. PCT/EP2012/003632, filed on Aug. 30, 2012, and published in German as WO 2013/037459 A1 on Mar. 21, 2013. This application claims the benefit and priority of German Application No. 10 2011 113 385.6, filed on Sep. 16, 2011. The entire disclosures of the above applications are incorporated herein by reference.

BACKGROUND

This section provides background information related to the present disclosure which is not necessarily prior art.

Technical Field

The present invention relates to a tool assembly for a rotating device.

Discussion

Rotating work pieces to produce round products has been known for a long time and is a standard machining method. A work piece is usually clamped and rotates about an axis of rotation. A cutting tool is brought to bear radially against the rotating work piece and creates a cut, for example a groove, in a material-removing process. By moving the tool in an appropriate way radially and axially, a matching contour can be turned into the work piece. The result is basically a rotationally symmetrical round contour.

It is also known in the prior art to generate off-round contours by rotation. To this end, a mount rotating around the rotating work piece is used as the cutting tool. The two rotations are coordinated so that cutting forces can take effect in a controlled manner and generate an off-round contour.

Quite apart from the fact that tools similarly rotating about an axis involve considerable mechanical complexity on the one hand, they have the primary disadvantage that they are used primarily in the end area of a work piece because they cannot be advanced into just any axial position.

Plunger-type guiding of a cutting tool has proved to be highly problematic. In order to guarantee industrially workable contours, the programming has to be extremely complex, because the tool location has to be programmed at practically all times. A highly dynamic axis is also required because very rapid movements have to be performed that may require impulse decoupling. On the other hand, extremely high forces occur for which plunger-type guiding is not designed. Adaptation to all work pieces is extremely complicated, and not all work pieces can be machined. Internal machining is difficult. In addition, tool variety is reduced.

SUMMARY OF THE INVENTION

Taking the prior art as the point of departure, an object of the present invention is to provide a device for off-round rotation that can be created with minimum technical and mechanical complexity and can, nonetheless, be used in almost any axial position of a work piece.

In order to achieve this object technically, a tool carrier is proposed having the features of the teachings of the present disclosure.

In accordance with the invention, a tool carrier is proposed that has a supporting body that can be moved along a path during a turning process during a rotation of the work piece. The motion is a contour-following motion, that is to say, the tool carrier moves back and forth with the cutting tool located thereon at a predetermined frequency on a path in the direction of the rotational axis of the tool. This motion is controlled and coordinated with the rotational speed of the work piece such that the requisite cutting forces are generated on the work piece at the respective correct rotational point. In this way almost any type of off-round contours can be generated at almost any axial position of a work piece. Desired contoured shapes can also be generated in the axial direction as well.

In accordance with an advantageous proposal of the invention, the supporting body is located directly or indirectly on a slide that permits a radial and/or axial motion of the supporting body. The supporting body can also be carried about a rotational axis and be essentially configured as a disc. The supporting body in the shape of a segment of a disc rotates about a rotational axis lying essentially parallel to the axis of rotation of the work piece and is moved back and forth around said axis to create the desired contour. The supporting body can also be configured as a lever.

For its part, the supporting body can be carried moveably on a supporting element that can be rotated or pivoted about at least one axis. In this way, machining operations can be carried out even on flat surfaces at an angle to the axis of rotation.

In order to create a corresponding motion, the supporting body is movable by way of an eccentric drive. The eccentric drive can be controlled in a simple manner, and this creates the desired motion. To do this, it is adjusted in proportion to the rotational speed of the work piece.

The invention proposes a tool assembly for a rotating device.

As was explained initially, rotating devices are used to perform a material-removing operation on a rotating work piece. It is known to clamp the work piece in a suitable spindle unit and to set it in motion around a rotational axis by means of a drive. Usually, high cutting speeds are set. A cutting tool is brought to bear against the rotating work piece at the desired location. With conventional rotating devices the tool can be positioned with respect to the axial location. When force is applied, a round contour is turned. In the case of the off-round rotating devices known in the prior art, the force and/or the contact between the tool and the work piece is controlled so that material is removed across partial radial sections of the work piece as well. The result is an off-round contour.

The invention proposes to configure the tool assembly of such a rotating device as a crank drive such that on the drive side a crank, known as an eccentric crank, is used and the piston is configured as a swinging piston. Both are connected by a thrust rod unit. The piston swings back and forth repeatedly about an axis between a front and a rear maximum. Because the eccentric can be adjusted, the thrust rod as well if necessary and in addition, if conditions warrant, the articulation point of the thrust rod assembly at the swinging piston, almost any shape of contour can be machined.

The construction in accordance with the invention has the advantage that almost any work piece can be controlled at almost any point and can be given almost any type of off-round contour that is industrially workable. For example, off-round pistons for very large engines, ships engines for example, can be machined at any axial location, on the face side and on the inside.

The swinging piston unit comprises a piston carried so it can pivot about an axis that is preferably configured as a segment of a disc. However, the piston can also be configured as a lever, have through holes and similar. The piston may be designed as a mass element. That means that it has a large mass itself and/or can be loaded with mass elements in which very great forces occur. In addition, the control of such an element is extremely precise. The device in accordance with the invention allows extremely close tolerances to be maintained.

The crank unit preferably incorporates a gear that transmits the centrally introduced driving force of an electric motor into an eccentrically rotating output pin. It is proposed to great advantage that the eccentricity can be adjusted, which means that the stroke of the tool can be changed in the transmission. This is turn is a measure for the tapering of the polygonal surfaces that are created by the machining.

The thrust rod unit is advantageously designed to be adjustable. It can be varied with respect to its length. Provision is also made in the invention for the pivot point of the thrust rod at the swinging piston to be variable. The adjustment is one measure for the resulting contour with respect to shape.

In accordance with the invention the entire device is mounted on a slide, as is known from the prior art. Such slides, or slide systems, allow the assembly to be moveable radially and/or axially so that hardly any restrictions need to be observed regarding the machining location with respect to the work piece.

Because the piston is configured as a swinging piston that swings about at least one axis, the result is a curvilinear path of motion for the effective tip/point of the cutting tool.

In accordance with an advantageous proposal of the invention, the different axes and bearing points of the supporting body can be adjustable. In this way, a rotational axis can be adjustable in any direction, for example radially to the work piece, vertically in addition or be given an inclination. A corresponding eccentricity can similarly be regulated in the same way. The adjustment is carried out advantageously in a coordinated fashion such that the cutting tool executes a motion on a radial path or, with regard to the rotational axis of the work piece, an arcuate path, to create the desired contour. Essentially, the tool should always be moved in the direction of the rotational axis of the work piece.

The eccentric drive can be pivoted at the supporting body by way of a crank gear in accordance with an advantageous proposal of the invention. The pivot points can also be designed to be adjustable.

Different intrinsically known technologies can be used for the adjustment and the drive, employing electric motors, hydraulic drives, electrical and hydraulic adjusting units with spindles, stepper motors, shafts and similar.

The invention represents a feasible and—with regard to long work pieces—extremely flexible device for creating off-round contours at an acceptable economic cost. Said device can be used in almost any axial position of a work piece. A normal rotational speed can be employed for the rotational machining.

In an advantageous way, all the potential adjustments for both the eccentric and the thrust rod are designed to be hydraulic. When necessary, this also applies to the imbalance compensation unit. A control assumes the task of rpm adjustment and eccentricity. If, for example, the swinging axis of the swinging piston is adjustable, a supporting unit here can be designed to be hydraulically adjustable.

BRIEF DESCRIPTION OF THE DRAWING

Additional advantages and features of the invention emerge from the following description, with reference to the FIGURE.

The drawing described herein is for illustrative purposes only of selected embodiments and not all possible implementations, and is not intended to limit the scope of the present disclosure.

FIG. 1 shows a schematic representation of an embodiment of a tool assembly in accordance with the invention.

DETAILED DESCRIPTION OF THE PREFERRED EMBODIMENTS

Example embodiments will now be described more fully with reference to the accompanying drawing.

The tool assembly 1, shown purely schematically, comprises a crank unit 2, a swinging piston unit 3 and a thrust rod unit 4. The swinging piston unit 3 comprises a disc-shaped swinging piston that pivots about an axis 5. A cutting tool 6 is shown schematically at the open end. In the embodiment shown the piston 3 is shown designed as a disc segment. On the outer edge, for example, it has a rail-like extension. Above this, it can be guided in a housing, as indicated by line 8 by meshing with a correspondingly precise guide.

The crank unit 2 has an eccentric 9, the eccentricity of which can preferably be adjusted. The thrust rod unit 4 is used as a connection, comprising a thrust rod 10 that is preferably designed to be adjustable in length. The pivot point 11 at the swinging piston 3 is preferably also variable. Crank unit 2 incorporates a gear unit 13 that transmits a centrally introduced driving force of an electric motor 14 into eccentric 9.

The embodiment described is solely for explanation and is not restrictive.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed:

1. A tool assembly for a rotating device having a drive, a control and a supporting arrangement for at least one tool insert, the tool assembly comprising a crank drive assembly, wherein the supporting arrangement comprises a swinging piston unit and the crank drive assembly comprises a crank unit, and the swinging piston unit and the crank unit are connected by a thrust rod unit wherein the crank unit includes a gear unit by means of which an input force rotating about an axis can be converted into an output force rotating eccentrically about the axis, wherein the crank unit includes an imbalance compensation unit.

2. The tool assembly from claim 1, wherein the swinging piston unit has a swinging piston carried pivotally about another axis.

3. The tool assembly from claim 2, wherein the swinging piston is configured as a segment of a disc.

4. The tool assembly from claim 2, wherein the swinging piston is configured as a mass carrier.

5. The tool assembly from claim 1, wherein the eccentricity of the crank unit can be adjusted.

6. The tool assembly from claim 1, wherein the drive comprises an electric motor.

7. The tool assembly from claim 6, wherein a speed of the electric motor can be controlled.

8. The tool assembly from claim 1, wherein a path of motion of a cutting tool located on the swinging piston is curvilinear.

9. The tool assembly from claim 1, wherein the thrust rod unit is adjustable in length.

10. The tool assembly from claim 1, wherein the tool assembly is located on a radially and/or longitudinally adjustable slide.

11. The tool assembly from claim 1, wherein a pivot point between thrust rod unit and swinging piston is variable.

* * * * *